: 3,843,527
ANTIFRICTION MATERIAL
Andrei Nikiforovich Filippov, pereulok 10, kv. 41,
Moscow, U.S.S.R.
No Drawing. Filed Apr. 27, 1971, Ser. No. 137,978
Int. Cl. C10m 7/04, 7/26, 7/30
U.S. Cl. 252—12                    8 Claims

ABSTRACT OF THE DISCLOSURE

An antifriction material:

(a) graphite powder and phenol-formaldehyde resin binder 30–95%
(b) phenol-aniline-formaldehyde resin 5–40%
(c) abrasive material selected from glass, talc, silica, and chromium oxide 0.5–5%
(d) metal selected from lead, tin, alloys thereof, and bronze 0–60%
(e) additive consisting of hexamethylenetetramine, stearine, and calcium hydroxide 3%.

---

The present invention relates to antifriction materials based on graphite and used in the manufacture of bearings, toe bearings and sealing members.

Known in the art are antifriction materials, for instance, graphite carbons and graphites impregnated with lead, tin, Babbit metal, copper and antimony which are used in bearings and end sealing rings for shafts of hydraulic systems operating in water.

These materials are very expensive and difficult to treat, since the sintering of these graphites requires much time amounting to days or even weeks, after which the workpieces having certain porosity are impregnated with molten metals in vacuum and under pressure.

Known in the art is an antifriction material comprising a powder of a plastic non-ferrous metal or an alloy thereof, phenol aniline-formaldehyde resin and graphite with binding agents consisting of phenol-formaldehyde resin and 3% of an additive by weight of the binder and including hexamethylentetramine, stearine and calcium hydroxide.

However, members made of this material operating at high speeds in cooperation with members made of pig iron are subject to increased wear since at high speeds of relative movement the sealing material is smeared on the end surface of a cooperating member.

It is an object of the present invention to provide an antifriction material having an increased ductility during hot pressing to ensure the filling of a compression mould, the members made of this material having increased strength and wear resistance in cooperation with members made of pig iron and also operating in various liquids.

The above object is accomplished by employing an antifriction material, which includes a powder of a plastic non-ferrous metal or an alloy thereof, phenol-aniline-formaldehyde resin, graphite with a binding agent containing of phenol-formaldehyde resin and 3% of an additive by weight of the binding agent, the additive containing hexamethylenetetramine, stearine and calcium hydroxide, and in which, according to the invention, said components are employed in the following percentages by weight:

|  | Percent |
|---|---|
| Graphite powder with 22–30% of a binding agent | 30–95 |
| Phenol-aniline-formaldehyde resin | 5–40 |

In addition to above-listed components the material also includes a powder of a plastic non-ferrous metal or an alloy thereof in an amount of 0 to 60%.

With such a ratio of the components, it becomes possible to produce a great number of antifriction materials of different compositions, and the parts manufactured from these materials ensure long-term and reliable operation of friction units under various conditions in cooperation with parts made from various materials. An increase in the content of a binding agent in graphite ensures good ductility of the antifriction material during hot pressing when press moulds are filled with said material, and in combination with phenol-aniline-formaldehyde resin the binding agent renders high erosion resistance to the material when operating in liquids.

It is preferred that in addition to the above-listed components the antifriction material should also incorporate a finely dispersed powder of abrasive material in an amount of 0.5–5% of the total weight of the components that enter into the material composition.

The inclusion of a powder of a finely dispersed abrasive material into the antifriction material adds to the wear resistance of the latter, since during the operation the members made of such material will polish their cooperating member and preclude smearing of the material thereonto.

It is preferred that French chalk be used as the finely dispersed powder of an abrasive material. Glass may also be used as an abrasive material.

A member cooperating with another member made of pig iron in a liquid medium should most preferably be made of an antifriction material comprising, by weight:

|  | Percent |
|---|---|
| Graphite powder with 22% of a binding agent | 50 |
| Lead powder | 39 |
| Phenol-anilineformaldehyde Resin | 10 |
| French chalk | 1 |

The antifriction material according to the invention may be advantageously used in the manufacture of end sealing rings and bearings for water pumps of automobile and tractor engines, sealing members and bearings for pumps of marine and vehicle diesel engines, various bearings and sealing rings for machines employed in food, chemical and textile industry, for domestic appliances, as well as for reinforced bearings and toe bearings.

The antifriction material according to the invention is prepared in the following manner.

A mixture containing thermoplastic phenol-formaldehyde resin, hexamethylenetetramine, stearine or calcium stearate and calcium hydroxide is prepared by said mixing components in a ball mill at a temperature less than 40° C. for 3–4 hours.

The above-mentioned phenol-formaldehyde resin is obtained by condensation of phenol formaldehyde in the presence of an acid catalyst, such as hydrochloric acid, with a ratio between the two retactants being 100:26.5–27.5 weight parts, respectively.

To the mixture thus prepared, which consists of thermoplastic phenol-formaldehyde resin, hexamethylenetetramine, stearine or calcium stearate, is added graphite (e.g., graphite wastes from electrode manufacture) having ash content less than 5% and particle size less than 2 mm., after which the mixture is mixed in a mixing machine from 1 hour to obtain uniform distribution of the components. The mixture thus obtained is rolled at 120–130° C., and then ground to particle size of 0.05–0.16 mm. and sieved through a screen having a desired mesh.

As mentioned above, for additional increase in the strength of the antifriction material space lattice and the erosion resistance thereof, thermosetting phenol-aniline-formaldehyde resin is added to the ground powdered mass, said resin being preliminarily ground to particle size of less than 0.16–0.18 mm.

The above-mentioned phenol-aniline formalde-hyde resin is prepared by condensation of phenol, aniline and formaldehyde in the presence of a basic catalyst, for instance, magnesium oxide or ammonia, with the ratio between the reactants being 100:55–51.8 parts by weights respectively.

For increasing wear resistance and heat conductivity of the material, a powder of a plastic non-ferrous metal, for instance, lead, tin, alloys thereof or bronze with particle size less than 0.1 mm., and a powder of an abrasive material with particle size less than 0.07 mm. are added to the ground powdered mass.

A finely comminuted powder of an abrasive material may comprise French chalk, glass, silica, or chromium oxide.

The mixture containing the above-mentioned components batched in a desired percent ratio is mixed in a mixing machine until a homogenous mass is produced.

This homogenous mass or moulding powder is batched and distributed into hot-pressing moulds.

In case of mass production of members on automatic rotary presses preliminary briquetting of workpieces is employed.

Pressing is performed at 155–175° C. and specific pressure of 800–1,200 kg./cm.$^2$.

The time of treatment depends on the size of member being produced.

Rings and bearings made of the antifriction material according to the invention are reliable and operate for a long period in sealing units of steam turbine supply pumps, water pumps for automobile, tractor and marine engines.

This antifriction material possesses the following advantages in operation in liquids:

(a) it is not porous, does not swell in water and preserves its shape;
(b) it is highly resistant to jet erosion;
(c) it ensures long-term reliable operation of a friction unit with minimum wear;
(d) it enables the production of small-size members without further machining and with full automation of the process of manufacture at a high output;
(e) in the manufacture of large-size heavy-duty bearings this material permits the press fitting into a metal cage provided with reinforcement.

An optimum composition of the material according to the invention depends on the operation conditions of the friction unit, nature and composition of the liquid, the temperature, speed of relative movement of frictionally engaged cooperating members, pressure of the liquid and characteristics of the material of a cooperating member.

EXAMPLE 1

An end sealing member for an electric supply pump for steam turbines is made of the antifriction material according to the invention which has the following composition:

|  | Percent |
|---|---|
| Graphite powder with 22% of a binding agent | 40 |
| Lead powder | 48.7 |
| Phenol-anilineformaldehyde resin | 10 |
| French chalk | 1.3 | and under the following operation conditions:

(a) sealed working medium—water at 102–104° C.
(b) peripheral speed—20–25 m./sec.
(c) pressure difference—0.2–0.5 kg./cm.$^2$
(d) material of a cooperating member—chromium steel, hardness HRC 35–40, shows a good running-in, resulting in a mirror-like appearance of both friction surfaces. After running-in there was substantially no wear on the sealing ring (after 1,000 hours of tests the wear amounted to 0.02 mm.).

EXAMPLE 2

A journal-thrust bearing of a circulation hot water pump is made of a material having the following composition:

|  | Percent |
|---|---|
| Graphite powder with 22% of binding agent | 40 |
| Lead powder | 49 |
| Phenol-anilineformaldehyde resin | 10 |
| French chalk | 1 | and under the following operation conditions:

(a) specific pressure—0.3 kg./cm.$^2$,
(b) peripheral speed—7.1 m./s.,
(c) water temperature—90–110° C.,
(d) material of a cooperating member—chromium steel, hardness HRC 40–42, shows a wear of 0.05 mm. after 7,000 hours of operation.

EXAMPLE 3

End sealing member of a water pump for an automobile engine is made of antifriction material having the following composition:

|  | Percent |
|---|---|
| Graphite with 22% of binding agent | 40 |
| Lead | 50 |
| Phenol-anilineformaldehyde resin | 10 |
| French chalk | 2 | and under the following operation conditions:

(a) specific pressure—0.08 kg./cm.$^2$,
(b) peripheral speed—6.8 m./s.,
(c) material of a cooperating member—pig iron,
(d) water temperature—90–95° C., shows a wear of 33 micron after 100 hours of operation.

For an end sealing member intended for simila purpose the antifriction material having the following composition is used:

|  | Percent |
|---|---|
| Graphite powder with 22% of binding agent | 40 |
| Lead powder | 50 |
| Phenol-anilineformaldehyde resin | 10 |
| Glass | 2 | which shows a wear of 38–40 micron after 100 hours of operation.

EXAMPLE 4

An end sealing member for the shaft of a water pump for an automobile motor is made of the antifriction material according to the invention having the following compositions:

|  | Percent |
|---|---|
| Graphite powder with 22% of binding agent | 50 |
| Lead powder | 39 |
| Phenol-anilineformaldehyde resin | 10 |
| French chalk | 1 | and under the following operational conditions:

(a) specific pressure—0.8–1.0 kg./cm.$^2$,
(b) peripheral speed—6.8 m./sec.,
(c) material of a cooperating member—pig iron,
(d) water temperature—90–95° C.

shows a wear of 15 microns after 100 hours of operation.

Where the material according to the invention is to be used in the manufacture of members operating in aggressive media, for instance, in solutions containing sulphuric acid, the content of the binding agent in graphite, as well as the content of the abrasive material should be increased up to a limit value.

In this case cooperating members reliably operate for a long period with minimum wear. In case the member made from the proposed antifriction material is to operate in edible liquids in cooperation with members manufactured from pig iron and stainless steels, lead is to be completely excluded and substituted by bronze, tin or other powders of non-ferrous metals that are not oxidants in relation to the given liquid, or the use of a non-ferrous metal powder is excluded altogether by increasing, instead, the content of phenol-anilineformaldehyde resin up to 40%. The latter substitution is possible in case the antifriction material is to operate under liquid friction conditions, and in case it is to operate under semi-liquid friction conditions the content of the components it changed to increase the content of graphite up to the limit value.

In case the members are to operate in pumps transferring sea water in cooperation with a member made of bronze, said member is to be made of the antifraction material having the following composition:

| | Percent |
|---|---|
| Graphite powder with 22% of binding agent | 40 |
| Lead | 49–49.5 |
| Phenol-anilineformaldehyde resin | 10 |
| French chalk | 0.5–1 |

What is claimed is:

1. An antifriction material consisting essentially of a graphite powder, a binder for said graphite, taken in an amount of 22–30% by weight of the graphite powder and consisting of phenol-formaldehyde resin, said graphite powder and said binder together being 30–95 wt. percent of said material; 3% by weight of the binder of an additive said additive consisting essentially of hexamethylenetetramine, stearine and calcium hydroxide; a powder of a plastic non-ferrous metal, selected from the group consisting of lead and tin, 0–60 wt. percent of said material; phenol-anilineformaldehyde resin, 5–40 wt. percent of said material; and a finely dispsersed powder of an abrasive material, selected from the group consisting of talc, glass, silica, and chromium oxide, 0.5–5 wt. percent of said material.

2. An antifriction material consisting essentially of a graphite powder, a binder for said graphite, taken in an amount of 22–30% by weight of the graphite powder and consisting of phenol-formaldehyde resin, said graphite powder and said binder together being 30–95 wt. percent of said material; an additive, taken in an amount of 3 percent by weight of the binder and consisting essentially of hexamethylenetetramine, stearine and calcium hydroxide; a powder of an alloy of a plastic non-ferrous metal, selected from the group consisting of lead and tin, 0.60 wt. percent of said material; phenol-anilineformaldehyde resin, 5–40 wt. percent of said material; and a finely dispersed powder of an abrasive material, selected from the group consisting of talc, glass, silica and chomium oxide, 0.5–5 wt. percent of said material.

3. An antifriction material as claimed in Claim 1, wherein said abrasive material is French chalk.

4. An antifriction material as claimed in Claim 1, wherein said abrasive material is glass.

5. An antifriction material as claimed in Claim 1, wherein in case a member is to operate in a liquid medium in cooperation with a member made of pig iron, said first-mentioned member is made of an antifriction material, having the following composition:

| | Percent |
|---|---|
| Graphite powder with 22% of a binder | 50 |
| Lead powder | 39 |
| Phenol-anilineformaldehyde resin | 10 |
| French chalk | 1 |

6. An antifriction material as claimed in Claim 2, wherein said abrasive material is French chalk.

7. An antifriction material as claimed in Claim 2, wherein said abrasive material is glass.

8. An antifriction material as claimed in Claim 2, wherein, in case a member is to operate in a liquid medium in cooperation with a member made of pig iron, said first-mentioned member is made of an antifriction material, having the following composition:

| | Percent |
|---|---|
| Graphite powder with 22% of a binder | 50 |
| Lead powder | 39 |
| Phenol-anilineformaldehyde resin | 10 |
| French chalk | 1 |

References Cited
UNITED STATES PATENTS

| Re. 26,088 | 9/1966 | Rulon-Miller et al. | 252—12.4 |
|---|---|---|---|
| 241,932 | 1881 | Colgan | 252—12.4 |
| 1,054,265 | 2/1913 | Balkeland | 252—12.6 |
| 2,400,091 | 5/1946 | Alfthan | 252—12.6 |
| 2,470,264 | 5/1949 | Richardson | 252—12.6 |
| 3,264,215 | 8/1966 | Smith et al. | 252—12 |
| 3,257,317 | 6/1966 | Bre et al. | 252—12 |
| 3,619,430 | 11/1971 | Hiratsuka | 252—12 |

DANIEL E. WYMAN, Primary Examiner

I. VAUGHN, Assistant Examiner